United States Patent
Heap et al.

(10) Patent No.: US 8,214,114 B2
(45) Date of Patent: Jul. 3, 2012

(54) CONTROL OF ENGINE TORQUE FOR TRACTION AND STABILITY CONTROL EVENTS FOR A HYBRID POWERTRAIN SYSTEM

(75) Inventors: Anthony H. Heap, Ann Arbor, MI (US); Wilfried Brunssen, Ypsilanti, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 835 days.

(21) Appl. No.: 12/249,277

(22) Filed: Oct. 10, 2008

(65) Prior Publication Data

US 2009/0118928 A1 May 7, 2009

Related U.S. Application Data

(60) Provisional application No. 60/985,256, filed on Nov. 4, 2007.

(51) Int. Cl.
*G06F 7/00* (2006.01)

(52) U.S. Cl. ............... 701/54; 701/22; 701/51; 701/84; 701/86; 701/87; 477/3; 477/5; 477/107; 477/110; 477/114; 180/197; 180/233; 180/248

(58) Field of Classification Search ............ 701/22, 701/51, 54, 84, 86–87; 180/197, 233, 248; 477/3, 5, 107, 110, 114

See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2004/0072650 A1 | 4/2004 | Matsumura et al. |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |

(Continued)

FOREIGN PATENT DOCUMENTS

EP 1 772 301 A2 4/2007

*Primary Examiner* — Thomas Black
*Assistant Examiner* — Luke Huynh

(57) ABSTRACT

An internal combustion engine is mechanically coupled to a hybrid transmission to transmit mechanical power to an output member. A method for controlling the internal combustion engine includes determining an accelerator output torque request based upon an operator input to the accelerator pedal, and determining an axle torque response type. A preferred input torque from the engine to the hybrid transmission is determined based upon the accelerator output torque request. An allowable range of input torque from the engine which can be reacted with the hybrid transmission is determined based upon the accelerator output torque request and the axle torque response type. The engine is controlled to meet the preferred input torque when the preferred input torque is within the allowable range of input torque from the engine. The engine is controlled within the allowable range of input torque from the engine when the preferred input torque is outside the allowable range of input torques from the engine.

18 Claims, 7 Drawing Sheets

U.S. PATENT DOCUMENTS

| | | |
|---|---|---|
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2005/0283283 A1 | 12/2005 | Hisada et al. |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1* | 9/2007 | Morris ............................ 701/51 |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |

| | | | | | |
|---|---|---|---|---|---|
| 2009/0118923 A1 | 5/2009 | Heap | 2009/0118944 A1 | 5/2009 | Heap |
| 2009/0118924 A1 | 5/2009 | Hsieh | 2009/0118945 A1 | 5/2009 | Heap |
| 2009/0118925 A1 | 5/2009 | Hsieh | 2009/0118946 A1 | 5/2009 | Heap |
| 2009/0118926 A1 | 5/2009 | Heap | 2009/0118947 A1 | 5/2009 | Heap |
| 2009/0118927 A1 | 5/2009 | Heap | 2009/0118948 A1 | 5/2009 | Heap |
| 2009/0118929 A1 | 5/2009 | Heap | 2009/0118949 A1 | 5/2009 | Heap |
| 2009/0118930 A1 | 5/2009 | Heap | 2009/0118950 A1 | 5/2009 | Heap |
| 2009/0118931 A1 | 5/2009 | Kaminsky | 2009/0118951 A1 | 5/2009 | Heap |
| 2009/0118932 A1 | 5/2009 | Heap | 2009/0118952 A1 | 5/2009 | Heap |
| 2009/0118933 A1 | 5/2009 | Heap | 2009/0118954 A1 | 5/2009 | Wu |
| 2009/0118934 A1 | 5/2009 | Heap | 2009/0118957 A1 | 5/2009 | Heap |
| 2009/0118935 A1 | 5/2009 | Heap | 2009/0118962 A1 | 5/2009 | Heap |
| 2009/0118936 A1 | 5/2009 | Heap | 2009/0118963 A1 | 5/2009 | Heap |
| 2009/0118937 A1 | 5/2009 | Heap | 2009/0118964 A1 | 5/2009 | Snyder |
| 2009/0118938 A1 | 5/2009 | Heap | 2009/0118969 A1 | 5/2009 | Heap |
| 2009/0118939 A1 | 5/2009 | Heap | 2009/0118971 A1 | 5/2009 | Heap |
| 2009/0118940 A1 | 5/2009 | Heap | 2009/0118999 A1 | 5/2009 | Heap |
| 2009/0118941 A1 | 5/2009 | Heap | 2009/0144002 A1 | 6/2009 | Zettel |
| 2009/0118942 A1 | 5/2009 | Hsieh | | | |
| 2009/0118943 A1 | 5/2009 | Heap | | | |

* cited by examiner

CONTROL OF ENGINE TORQUE FOR TRACTION AND STABILITY CONTROL EVENTS FOR A HYBRID POWERTRAIN SYSTEM

CROSS REFERENCE TO RELATED APPLICATIONS

This application claims the benefit of U.S. Provisional Application No. 60/985,256, filed on Nov. 4, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The Machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

An internal combustion engine is mechanically coupled to a hybrid transmission to transmit mechanical power to an output member. A method for controlling the internal combustion engine includes determining an accelerator output torque request based upon an operator input to the accelerator pedal, and determining an axle torque response type. A preferred input torque from the engine to the hybrid transmission is determined based upon the accelerator output torque request. An allowable range of input torque from the engine which can be reacted with the hybrid transmission is determined based upon the accelerator output torque request and the axle torque response type. The engine is controlled to meet the preferred input torque when the preferred input torque is within the allowable range of input torque from the engine. The engine is controlled within the allowable range of input torque from the engine when the preferred input torque is outside the allowable range of input torques from the engine.

BRIEF DESCRIPTION OF THE DRAWINGS

One or more embodiments will now be described, by way of example, with reference to the accompanying drawings, in which.

DETAILED DESCRIPTION

Figure 1:
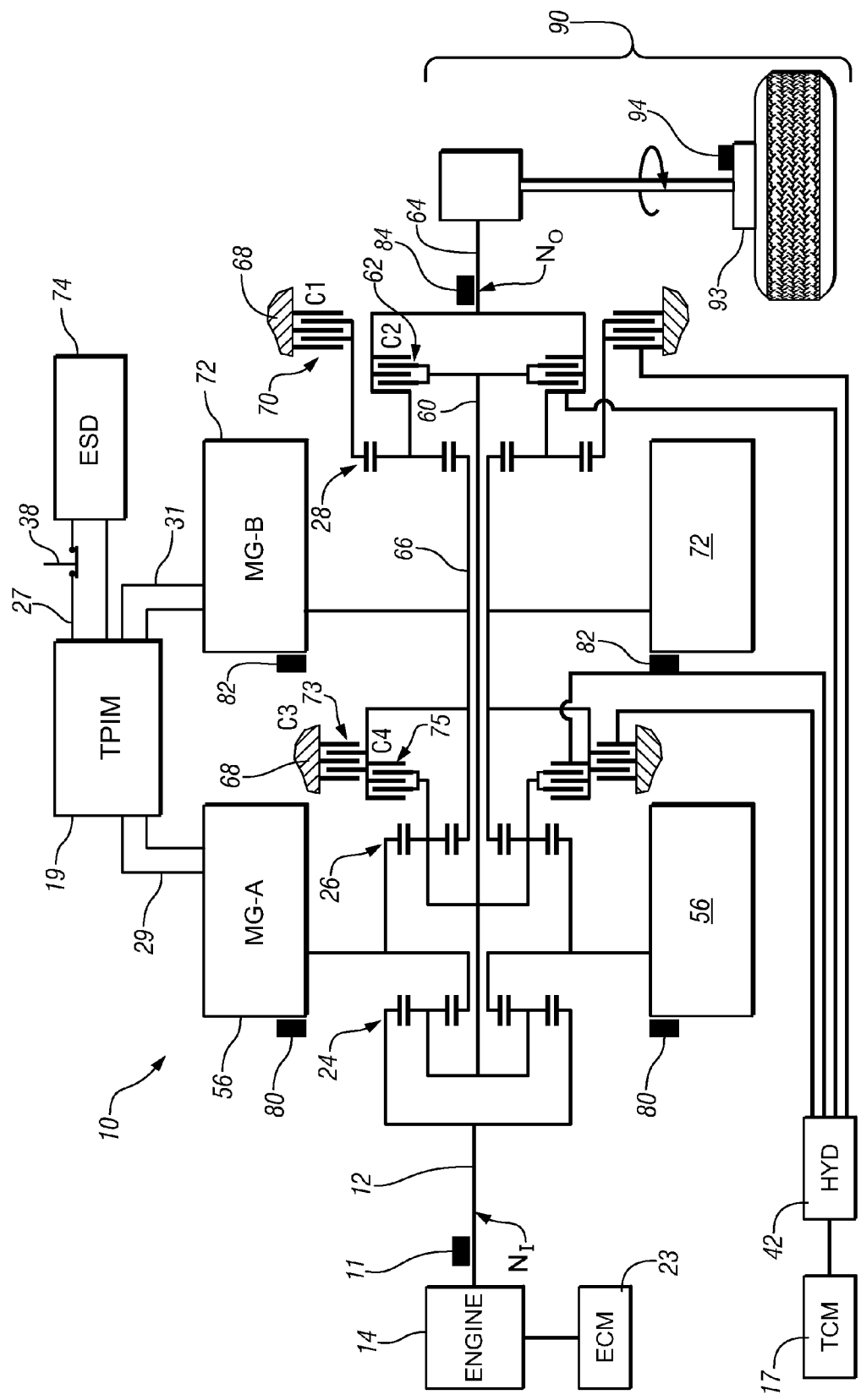
FIG. 1 is a schematic diagram of an exemplary hybrid powertrain, in accordance with the present disclosure.
Figure 2:
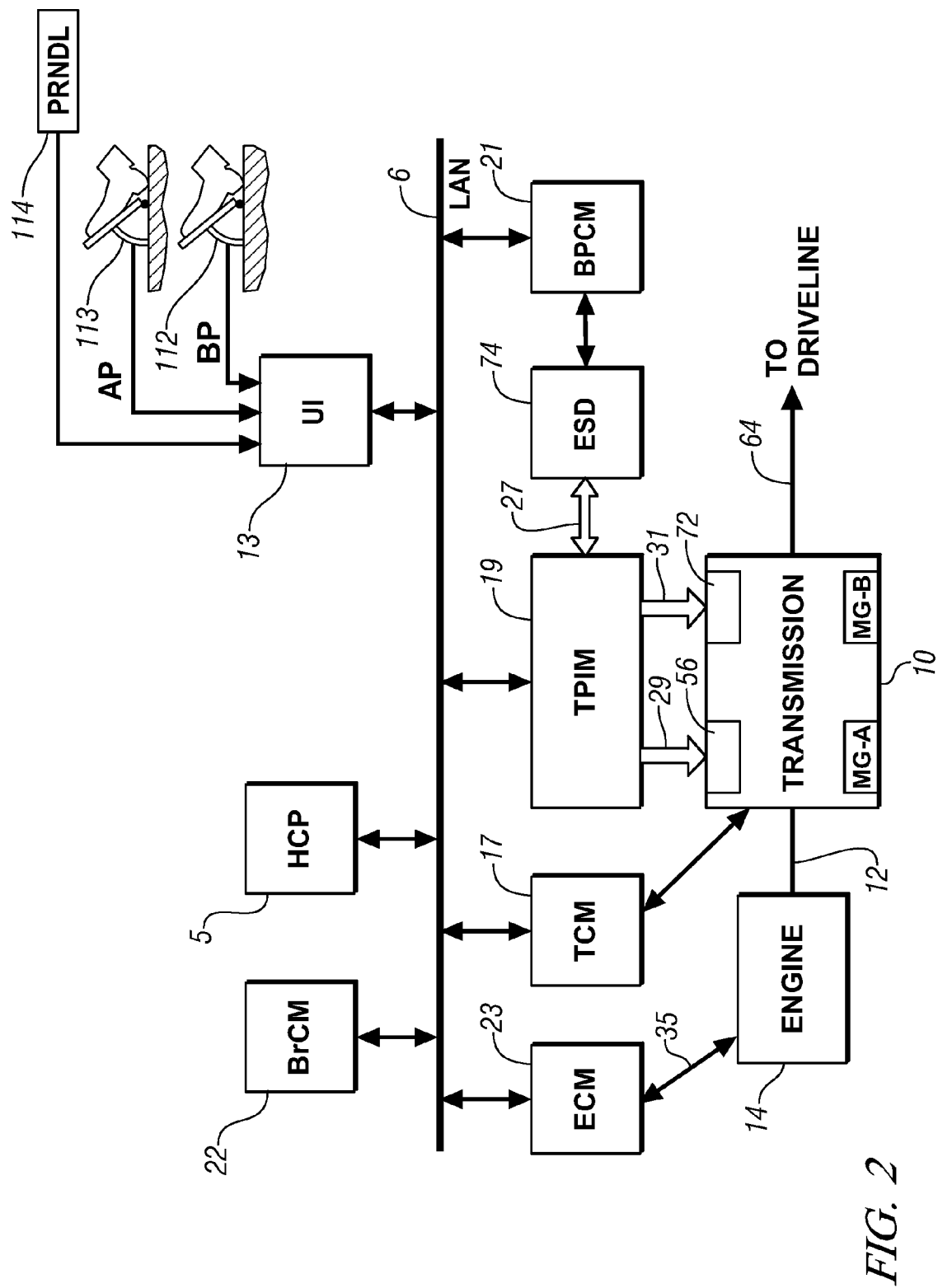
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electro-mechanical hybrid transmission 10 operatively connected to an engine 14 and torque machines comprising first and second electric machines ('MG-A') 56 and ('MG-B') 72. The engine 14 and the torque machines, i.e., the first and second electric machines 56 and 72 each generate power which can be transmitted to the transmission 10. The power generated by the engine 14 and the first and second electric machines 56 and 72 and transmitted to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19 and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to meet the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, a brake control module (hereafter 'BrCM') 22, and the TPIM 19. A hybrid control module (hereafter 'HCP') 5 provides supervisory control and coordination of the ECM 23, the TCM 17, the BPCM 21, the BrCM 22 and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines various commands, including: the operator torque request, an output torque command ('$T_{CMD}$') to the driveline 90, an input torque command, clutch torque(s) ('$T_{CL}$') for the applied torque-transfer clutches C1 70, C2 62, C3 73, C4 75 of the transmission 10; and the torque commands $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the input torque command from the HCP 5. The ECM 23 determines the actual input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 signally connects to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

The BrCM 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque actuators to meet the operator torque request at the output member 64 for transference to the driveline 90. The torque actuators preferably include torque generative devices, e.g., the engine 14 and torque machines comprising the first and second electric machines 56 and 72 in this embodiment. The torque actuators preferably further include a torque transferring device, comprising the transmission 10 in this embodiment. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request, communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
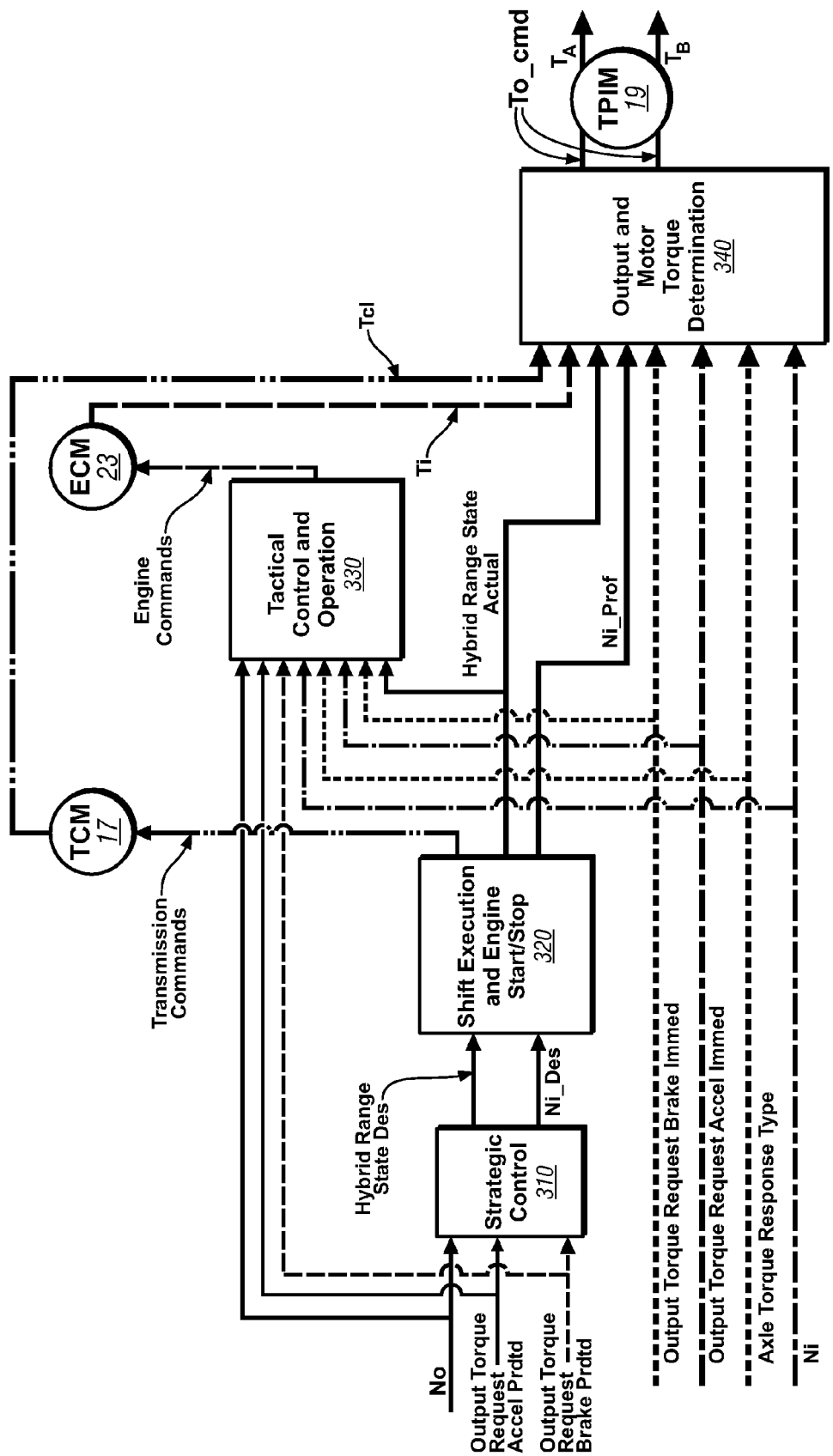
FIGS. 3 and 4 are schematic flow diagrams of a control scheme, in accordance with the present disclosure.

FIG. 3 shows a control system architecture for controlling and managing signals related to torque and power flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having a single electric machine, and a hybrid powertrain system having multiple electric machines. The control system architecture includes a plurality of inputs to a strategic optimization control scheme ('Strategic Control') 310, which determines a preferred input speed ('Ni_Des') and a preferred operating range state ('Hybrid Range State Des') based upon the output speed and the operator torque request, and optimized based upon other operating parameters of the hybrid powertrain, including battery power limits and response limits of the engine 14, transmission 10, and first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming time-rate change in the input speed and preferably comprises a scalar parametric value that is a targeted input speed for the forthcoming loop cycle, based upon the engine operating commands and the operator torque request during a transition in the operating range state of the transmission.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Operating the powertrain system includes shifting transmission operation between operating range states, which can include transitioning to one or more intermediate operating range states during a shift and controlling engine operation to achieve target input speeds. Capability to change operation of the engine 14 from a present speed to the target input speed can include executing algorithms to determine an achievable or preferred input member acceleration rate, e.g., one of the preferred acceleration rates comprising an immediate lead input acceleration profile and a predicted lead input acceleration profile. This includes selecting independently controllable parameters for controlling the transfer of power through the powertrain system. Parametric equations are derived for the acceleration rate of the input member based upon torque outputs from the first and second torque machines, e.g., the first and second electric machines 56 and 72 in one embodiment. The algorithms are executed to simultaneously solve the parametric equations and determine a preferred acceleration rate for the input member. Operation of the engine 14 can be controlled to achieve the preferred acceleration rate for the input member 12.

The BrCM 22 commands the friction brakes on the wheels 93 to apply braking force and generates a command for the transmission 10 to create a negative output torque which reacts with the driveline 90 in response to a net operator input to the brake pedal 112 and the accelerator pedal 113. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electro-mechanical transmission 10 and the engine 14. The negative output torque reacted through the electro-mechanical transmission 10 can be transferred to the first and second electric machines 56 and 72 to generate electric power for storage in the ESD 74.

The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and the axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system including to the tactical control scheme 330.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to shape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

Blended brake torque includes a combination of the friction braking torque generated at the wheels 93 and the output torque generated at the output member 64 which reacts with the driveline 90 to decelerate the vehicle in response to the operator input to the brake pedal 112.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

The predicted accelerator output torque request and the predicted brake output torque request are input to the strategic optimization control scheme ('Strategic Control') 310. The strategic optimization control scheme 310 determines a desired operating range state for the transmission 10 ('Hybrid Range State Des') and a desired input speed from the engine 14 to the transmission 10 ('Ni Des'), which comprise inputs to the shift execution and engine operating state control scheme ('Shift Execution and Engine Start/Stop') 320.

A change in the input torque from the engine 14 which reacts with the input member from the transmission 10 can be effected by changing mass of intake air to the engine 14 by controlling position of an engine throttle utilizing an electronic throttle control system (not shown), including opening the engine throttle to increase engine torque and closing the engine throttle to decrease engine torque. Changes in the input torque from the engine 14 can be effected by adjusting ignition timing, including retarding spark timing from a mean-best-torque spark timing to decrease engine torque. The engine state can be changed between the engine-off state and the engine-on state to effect a change in the input torque. The engine state can be changed between the all-cylinder operating state and the cylinder deactivation operating state, wherein a portion of the engine cylinders are unfueled. The engine state can be changed by selectively operating the engine 14 in one of the fueled state and the fuel cutoff state wherein the engine is rotating and unfueled. Executing a shift in the transmission 10 from a first operating range state to a second operating range state can be commanded and achieved by selectively applying and deactivating the clutches C1 70, C2 62, C3 73, and C4 75.

Figure 4A:
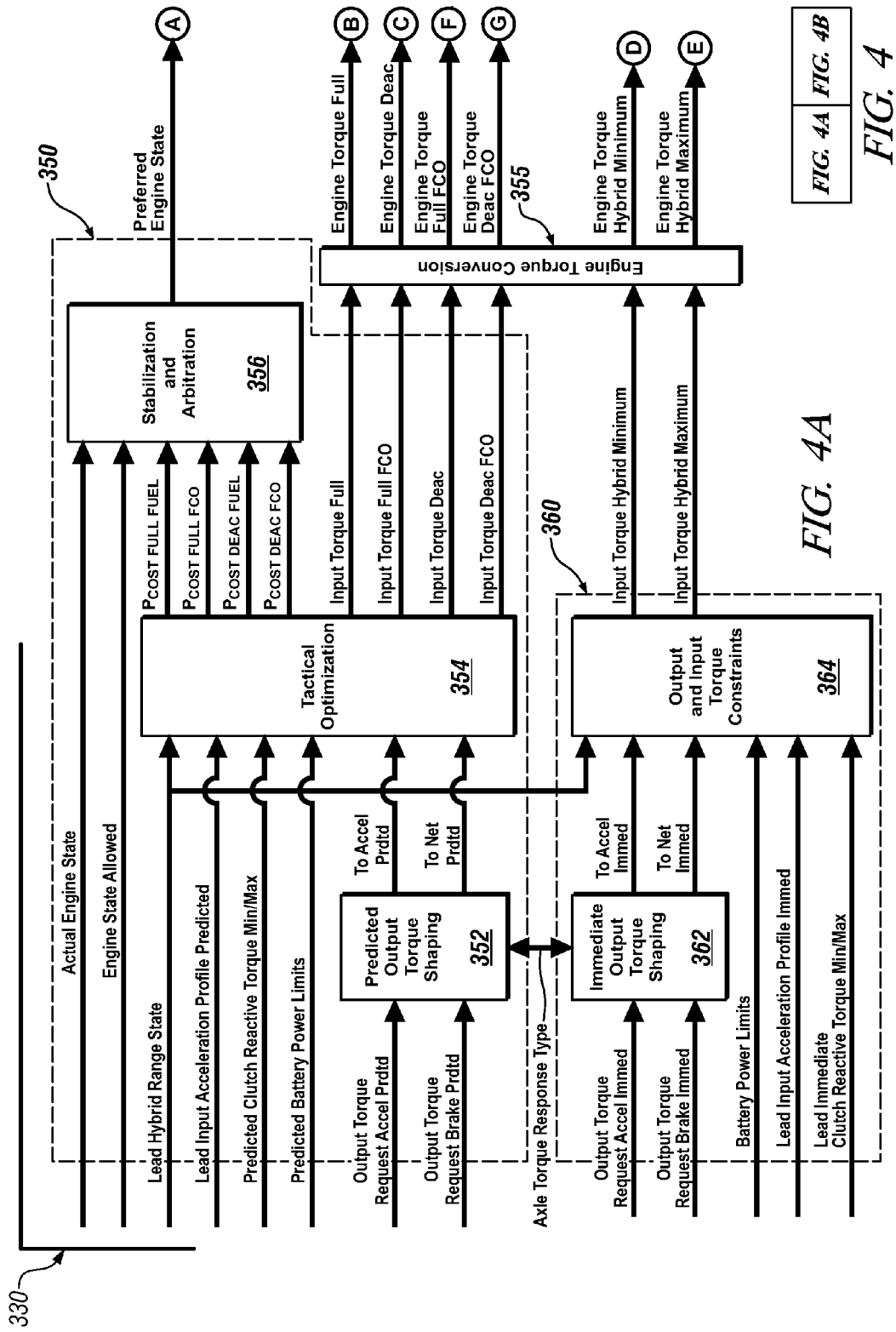
Figure 4B:
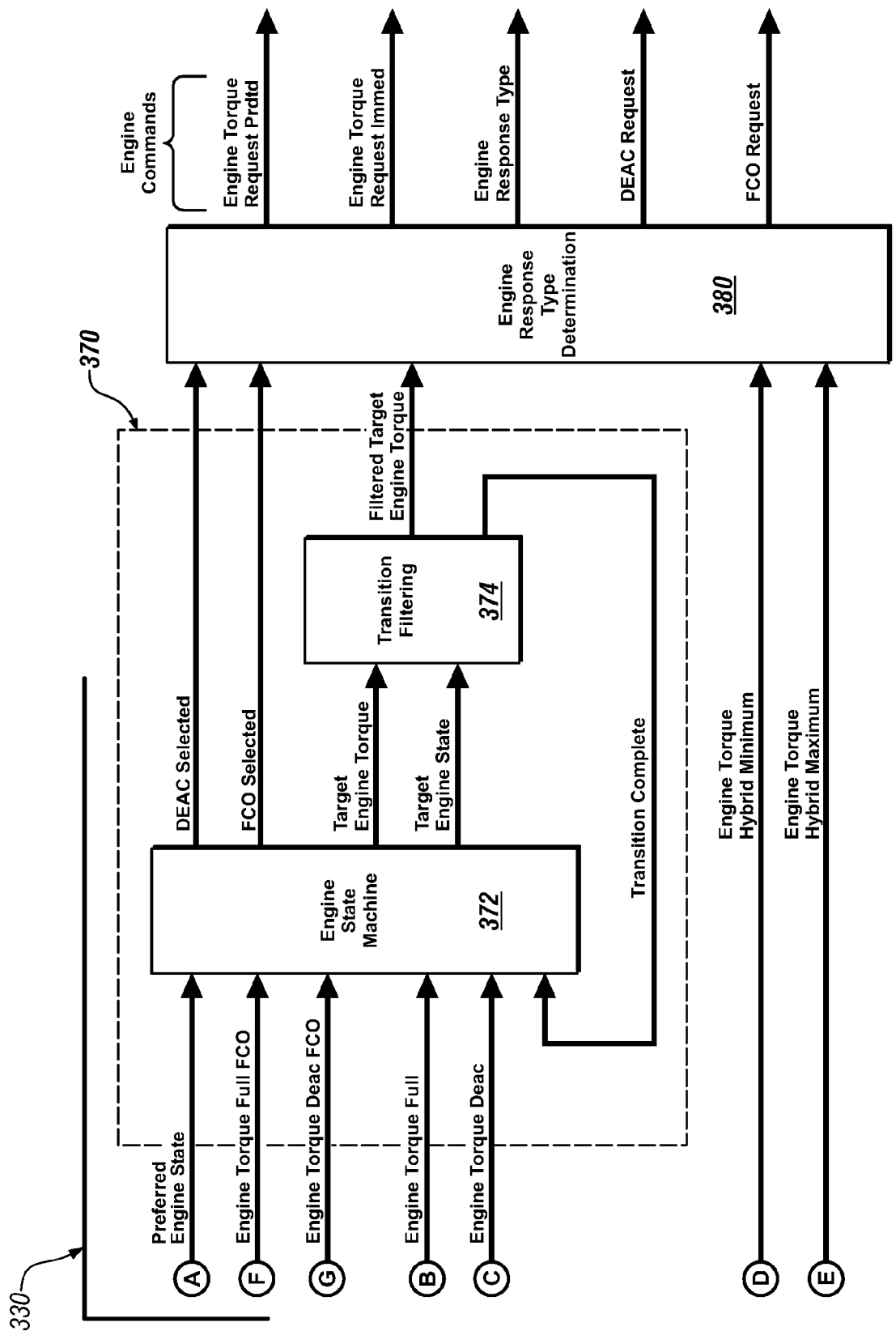

FIG. 4 details the tactical control scheme ('Tactical Control and Operation') 330 for controlling operation of the engine 14, described with reference to the hybrid powertrain system of FIGS. 1 and 2 and the control system architecture of FIG. 3. The tactical control scheme 330 includes a tactical optimization control path 350 and a system constraints control path 360 which are preferably executed concurrently. The outputs of the tactical optimization control path 350 are input to an engine state control scheme 370. The outputs of the engine state control scheme 370 and the system constraints control path 360 are input to an engine response type determination scheme ('Engine Response Type Determination') 380 for controlling the engine state, the immediate engine torque request and the predicted engine torque request.

The operating point of the engine 14 as described in terms of the input torque and input speed that can be achieved by controlling mass of intake air to the engine 14 when the engine 14 comprises a spark-ignition engine by controlling position of an engine throttle (not shown) utilizing an electronic throttle control device (not shown). This includes opening the throttle to increase the engine input speed and torque output and closing the throttle to decrease the engine input speed and torque. The engine operating point can be achieved by adjusting ignition timing, generally by retarding spark timing from a mean-best-torque spark timing to decrease engine torque.

When the engine 14 comprises a compression-ignition engine, the operating point of the engine 14 can be achieved by controlling the mass of injected fuel, and adjusted by retarding injection timing from a mean-best-torque injection timing to decrease engine torque.

The engine operating point can be achieved by changing the engine state between the engine-off state and the engine-on state. The engine operating point can be achieved by controlling the engine state between the all-cylinder state and the cylinder deactivation state, wherein a portion of the engine cylinders are unfueled and the engine valves are deactivated. The engine state can include the fuel cutoff state wherein the engine is rotating and unfueled to effect engine braking.

The tactical optimization control path 350 acts on substantially steady state inputs to select a preferred engine state and determine a preferred input torque from the engine 14 to the transmission 10. The inputs originate in the shift execution and engine operating state control scheme 320. The tactical optimization control path 350 includes an optimization scheme ('Tactical Optimization') 354 to determine preferred input torques for operating the engine 14 in the all-cylinder state ('Input Torque Full'), in the cylinder deactivation state ('Input Torque Deac'), the all-cylinder state with fuel cutoff ('Input Torque Full FCO'), in the cylinder deactivation state with fuel cutoff ('Input Torque Deac FCO'), and a preferred engine state ('Preferred Engine State'). Inputs to the optimization scheme 354 include a lead operating range state of the transmission 10 ('Lead Hybrid Range State') a predicted lead input acceleration profile ('Lead Input Acceleration Profile Predicted'), a predicted range of clutch reactive torques ('Predicted Clutch Reactive Torque Min/Max') for each presently applied clutch, predicted battery power limits ('Predicted Battery Power Limits') and predicted output torque requests for acceleration ('Output Torque Request Accel Prdtd') and braking ('Output Torque Request Brake Prdtd'). The predicted output torque requests for acceleration and braking are combined and shaped with the axle torque response type through a predicted output torque shaping filter 352 to yield a predicted net output torque request ('To Net Prdtd') and a predicted accelerator output torque request ('To Accel Prdtd'), which are inputs to the optimization scheme 354. The lead operating range state of the transmission 10 comprises a time-shifted lead of the operating range state of the transmission 10 to accommodate a response time lag between a commanded change in the operating range state and a measured change in the operating range state. The predicted lead input acceleration profile comprises a time-shifted lead of the predicted input acceleration profile of the input member 12 to accommodate a response time lag between a commanded change in the predicted input acceleration profile and a measured change in the predicted input acceleration profile. The optimization scheme 354 determines costs for operating the engine 14 in the engine states, which comprise operating the engine fueled and in the all-cylinder state ('$P_{COST\ FULL\ FUEL}$'), operating the engine unfueled and in the all-cylinder state ('$P_{COST\ FULL\ FCO}$'), operating the engine fueled and in cylinder deactivation state ('$P_{COST\ DEAC\ FUEL}$'), and operating the engine unfueled and in the cylinder deactivation state ('$P_{COST\ DEAC\ FCO}$'). The aforementioned costs for operating the engine 14 are input to a stabilization analysis scheme ('Stabilization and Arbitration') 356 along with the actual engine state ('Actual Engine State') and an allowable or permissible engine state ('Engine State Allowed') to select one of the engine states as the preferred engine state ('Preferred Engine State').

The preferred input torques for operating the engine 14 in the all-cylinder state and in the cylinder deactivation state with and without fuel cutoff are input to an engine torque conversion calculator ('Engine Torque Conversion') 355 and converted to preferred engine torques in the all-cylinder state and in the cylinder deactivation state ('Engine Torque Full') and ('Engine Torque Deac') and with fuel cutoff in the all-cylinder state and in the cylinder deactivation state ('Engine Torque Full FCO') and ('Engine Torque Deac FCO') respectively, by taking into account parasitic and other loads introduced between the engine 14 and the transmission 10. The preferred engine torques for operation in the all-cylinder state and in the cylinder deactivation state and the preferred engine state comprise inputs to the engine state control scheme 370.

The costs for operating the engine 14 include operating costs which are generally determined based upon factors that include vehicle driveability, fuel economy, emissions, and battery usage. Costs are assigned and associated with fuel and electrical power consumption and are associated with a specific operating points of the hybrid powertrain. Lower operating costs are generally associated with lower fuel consumption at high conversion efficiencies, lower battery power usage, and lower emissions for each engine speed/load operating point, and take into account the present operating state of the engine 14.

The preferred engine state and the preferred engine torques in the all-cylinder state and in the cylinder deactivation state are input to the engine state control scheme 370, which includes an engine state machine ('Engine State Machine') 372. The engine state machine 372 determines a target engine torque ('Target Engine Torque') and a target engine state ('Target Engine State') based upon the preferred engine torques and the preferred engine state. The target engine torque and the target engine state are input to a transition filter ('Transition Filtering') 374 which monitors any commanded transition in the engine state and filters the target engine torque to provide a filtered target engine torque ('Filtered Target Engine Torque'). The engine state machine 372 outputs a command that indicates selection of one of the cylinder deactivation state and the all-cylinder state ('DEAC Selected') and indicates selection of one of the engine-on state and the deceleration fuel cutoff state ('FCO Selected').

The selection of one of the cylinder deactivation state and the all-cylinder state and the selection of one of the engine-on state and the deceleration fuel cutoff state, the filtered target engine torque, and the minimum and maximum engine torques are input to the engine response type determination scheme 380.

The system constraints control path 360 determines constraints on the input torque, comprising minimum and maximum input torques ('Input Torque Hybrid Minimum' and 'Input Torque Hybrid Maximum') that can be reacted by the transmission 10. The minimum and maximum input torques are determined based upon constraints to the transmission 10 and the first and second electric machines 56 and 72, including clutch torques and battery power limits, which affect the capacity of the transmission 10 to react input torque during the current loop cycle. Inputs to the system constraints control path 360 include the immediate output torque request as measured by the accelerator pedal 113 ('Output Torque Request Accel Immed') and the immediate output torque request as measured by the brake pedal 112 ('Output Torque Request Brake Immed') which are combined and shaped with the axle torque response type through an immediate output torque shaping filter ('Immediate Output Torque Shaping') 362 to yield a net immediate output torque ('To Net Immed') and an immediate accelerator output torque ('To Accel Immed'). The net immediate output torque and the immediate accelerator output torque are inputs to a constraints scheme ('Output and Input Torque Constraints') 364. Other inputs to the constraints scheme 364 include the lead operating range state of the transmission 10, an immediate lead input acceleration profile ('Lead Input Acceleration Profile Immed'), a lead immediate clutch reactive torque range ('Lead Immediate Clutch Reactive Torque Min/Max') for each presently applied clutch, and the available battery power ('Battery Power Limits') comprising the range $P_{BAT\_MIN}$ to $P_{BAT\_MAX}$. The immediate lead input acceleration profile comprises a time-shifted lead of the immediate input acceleration profile of the input member 12 to accommodate a response time lag between a commanded change in the immediate input acceleration profile and a measured change in the immediate input acceleration profile. The lead immediate clutch reactive torque range comprises a time-shifted lead of the immediate clutch reactive torque range of the clutches to accommodate a response time lag between a commanded change in the immediate clutch torque range and a measured change in the immediate clutch reactive torque range. The constraints scheme 364 determines an output torque range for the transmission 10, and then determines the minimum and maximum allowable input torques ('Input Torque Hybrid Minimum' and 'Input Torque Hybrid Maximum' respectively) that can be reacted by the transmission 10 based upon the aforementioned inputs. The minimum and maximum allowable input torques can change during ongoing operation, due to changes in the aforementioned inputs, including increasing energy recovery through electric power regeneration through the transmission 14 and first and second electric machines 56 and 72.

The minimum and maximum allowable input torques are input to the engine torque conversion calculator 355 and converted to minimum and maximum engine torques ('Engine Torque Hybrid Minimum' and 'Engine Torque Hybrid Maximum' respectively), by taking into account parasitic and other loads introduced between the engine 14 and the transmission 10.

The filtered target engine torque, the output of the engine state machine 372 and the minimum and maximum engine torques are input to the engine response type determination scheme 380, which inputs the engine commands to the ECM 23 for controlling the engine state, the immediate engine torque request and the predicted engine torque request. The engine commands include an immediate engine torque request ('Engine Torque Request Immed') and a predicted engine torque request ('Engine Torque Request Prdtd') that can be determined based upon the filtered target engine torque. Other commands control the engine state to one of the engine fueled state and the deceleration fuel cutoff state ('FCO Request') and to one of the cylinder deactivation state and the all-cylinder state ('DEAC Request'). Another output comprises an engine response type ('Engine Response Type'). When the filtered target engine torque is within the range between the minimum and maximum engine torques, the engine response type is inactive. When the filtered target engine torque is outside the constraints of the minimum and maximum engine torques ('Engine Torque Hybrid Minimum') and ('Engine Torque Hybrid Maximum') the engine response type is active, indicating a need for an immediate change in the engine torque, e.g., through engine spark control and retard to change the engine torque and the input torque to fall within the constraints of the minimum and maximum engine torques.

Figure 5:
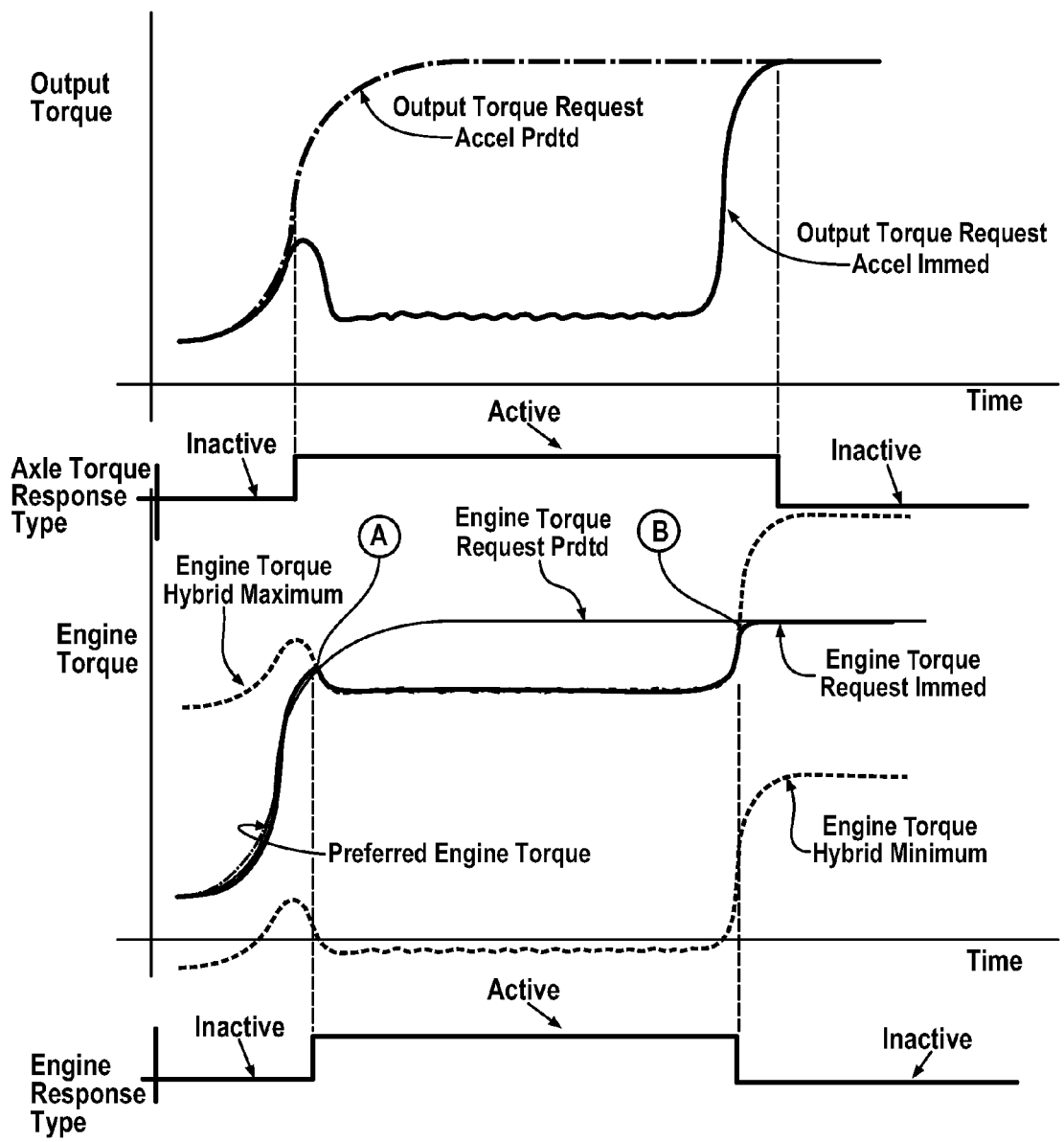
FIGS. 5 and 6 are graphical diagrams, in accordance with the present disclosure.
Figure 6:
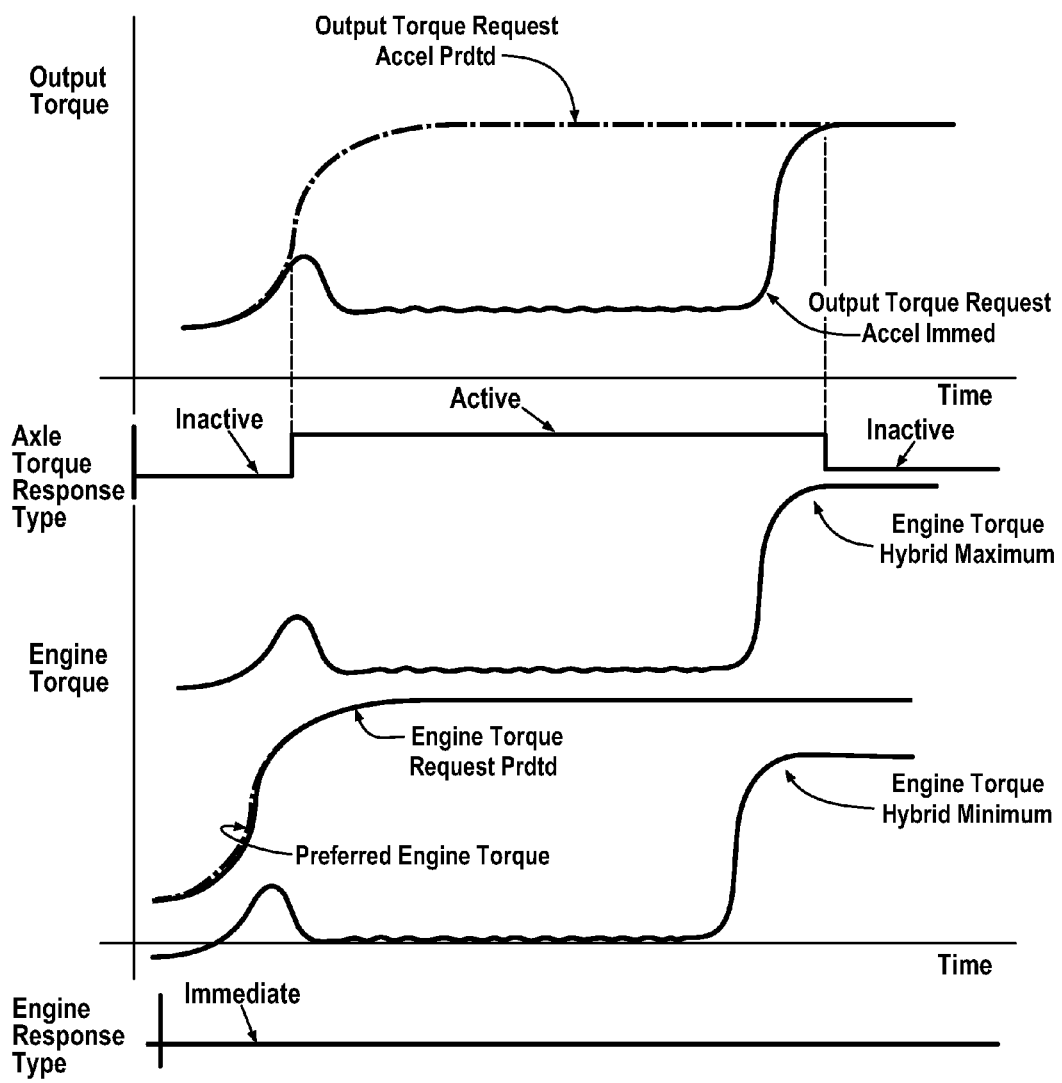

FIGS. 5 and 6 graphically show operation of a method to control engine torque input to a hybrid transmission, described with reference to the exemplary powertrain system described with reference to FIGS. 1 and 2 utilizing a control system described with reference to FIGS. 3 and 4. A skilled practitioner can apply the method to other powertrain systems.

FIG. 5 shows operation of the powertrain including an event that causes the control system to command an immediate reduction in the output torque at the output member 64 to the driveline 90, preferably by a change in the axle torque response type from the inactive state to the active state that can be caused by a traction control event or a vehicle stability event. This causes the immediate accelerator output torque request ('Output Torque Request Accel Immed') to decrease. The system constraints control path 360 reduces the maximum engine torque that can be reacted by the transmission 10 ('Engine Torque Hybrid Maximum'). When the maximum engine torque that can be reacted by the transmission 10 becomes less than the preferred engine torque ('Preferred Engine Torque') for operating the engine 14 that is output from the tactical optimization control path 350, shown as point A, the engine response type output from the engine response type determination scheme 380 changes the engine response type from inactive to active. The immediate engine torque request output ('Engine Torque Request Immed') decreases consistent with the maximum engine torque that can be reacted by the transmission 10, and can be achieved by active engine management schemes including retarding spark advance, or advancing fuel injection timing to reduce the engine torque. This operation continues during the period when the maximum engine torque that can be reacted by the transmission 10 is less than the preferred engine torque for operating the engine 14. When the maximum engine torque that can be reacted by the transmission 10 is greater than the preferred engine torque for operating the engine 14, shown at point B, the engine response type shifts to inactive and engine operation discontinues the active engine management schemes. Subsequently the axle torque response type can become inactive. When the axle torque response type changes from the active state to the inactive state, the immediate and predicted output torque requests become equal with the preferred engine torque for operating the engine 14.

FIG. 6 shows a second operation of the powertrain wherein an event causes the control system to command an immediate reduction in the output torque at the output member 64 to the driveline 90, preferably by a change in the axle torque response type from the inactive state to the active state which can be caused by a traction control event or a vehicle stability event. The immediate accelerator output torque request ('Output Torque Request Accel Immed') decreases. The system constraints control path 360 reduces the maximum engine torque ('Engine Torque Hybrid Maximum') that can be reacted by the transmission 10. When the maximum engine torque that can be reacted by the transmission 10 remains greater than the preferred engine torque ('Preferred Engine Torque') for operating the engine 14 that is output from the tactical optimization control path 350, the engine response type output from the engine response type determination scheme 380 remains as the immediate engine torque request, and the engine operation is unaffected. The output torque from the powertrain system is reduced through control of the output and motor torque control scheme 340, and engine power can be consumed by one of the electric machines, preferably to generate electric power.

The method and system are described hereinabove with reference to an embodiment including the engine 14 and the first and second electric machines 56 and 72 mechanically connected to the electro-mechanical transmission 10. Alternatively, the system can be used with other electro-mechanical transmission systems (not shown) which have a single electric machine. Alternatively, the system can be used with other electro-mechanical transmission systems (not shown) which have three or more electric machines. Alternatively, the system can be used with other hybrid transmission systems (not shown) which utilize torque-generative machines and energy storage systems, e.g., hydraulic-mechanical hybrid transmissions.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling an internal combustion engine mechanically coupled to a hybrid transmission to transfer power to a driveline, comprising:
   monitoring operator inputs to an accelerator pedal and a brake pedal;
   determining immediate and predicted accelerator output torque requests based upon the operator input to the accelerator pedal;
   determining an axle torque response type comprising one of active and inactive response;
   determining a preferred input torque from the engine to the hybrid transmission based upon the predicted accelerator output torque request;
   determining an allowable range of input torques from the engine to react with the hybrid transmission based upon the immediate accelerator output torque request and the axle torque response type;
   operating the engine to meet the preferred input torque when the preferred input torque is within the allowable range of input torques from the engine; and
   operating the engine within the allowable range of input torques from the engine when the preferred input torque is outside the allowable range of input torques from the engine.

2. The method of claim 1, comprising setting the axle torque response type to the active response when one of a fraction control event and a vehicle stability event is commanded.

3. The method of claim 1, wherein determining the immediate accelerator output torque request based upon the operator input to the accelerator pedal comprises determining a presently occurring operator input to the accelerator pedal to generate an immediate output torque.

4. The method of claim 1, wherein determining the predicted accelerator torque request comprises a preferred output torque at the driveline.

5. The method of claim 1, further comprising increasing the allowable range of input torques from the engine by increasing electric power regeneration through the hybrid transmission and operating the engine within the allowable range of input torques from the engine when the preferred input torque is outside the allowable range of input torques from the engine.

6. The method of claim 1, further comprising determining the allowable range of input torques from the engine which can be reacted by the hybrid transmission based upon power limits of a second power generator operative to transfer mechanical power to the hybrid transmission and a torque transfer capacity of the hybrid transmission.

7. The method of claim 1, further comprising operating the engine within the allowable range of input torques by decreasing the power output from the engine.

8. The method of claim 7, comprising decreasing the power output from the engine by retarding spark advance of the engine.

9. The method of claim 7, comprising decreasing the power output from the engine by advancing timing of fuel injection of the engine.

10. The method of claim 1, further comprising operating the engine within the allowable range of engine torque by increasing the power output from the engine.

11. Method for controlling an engine coupled to a transmission device, the transmission device operative to transfer mechanical power from the engine and a second power generating device to an output member, the method comprising:
monitoring operator inputs to an accelerator pedal and a brake pedal to determine an immediate accelerator torque request and a predicted accelerator output torque request;
determining an axle torque response type comprising one of active and inactive;
determining a preferred input torque from the engine to the transmission device based upon the predicted accelerator output torque request;
determining an allowable range of input torques from the engine which can be reacted by the transmission device based upon the accelerator output torque request and the axle torque response type;
operating the engine at the preferred input torque when the preferred input torque is within the allowable range of input torques from the engine which can be reacted by the transmission device; and
operating the engine within the allowable range of input torques from the engine when the preferred input torque is outside the allowable range of input torques from the engine which can be reacted by the transmission device.

12. The method of claim 11, wherein the allowable range of input torques from the engine which can be reacted by the transmission device is determined based upon the predicted accelerator output torque request when the axle torque response type is inactive.

13. The method of claim 12, wherein the allowable range of input torques from the engine which can be reacted by the transmission device is determined based upon the immediate accelerator output torque request when the axle torque response type is active.

14. The method of claim 11, further comprising determining the allowable range of input torques from the engine which can be reacted by the transmission device based upon power limits of the second power generating device and a torque transfer capacity of the transmission.

15. The method of claim 14, further comprising including a selectively applied torque transfer clutch in the transmission, and determining the torque transfer capacity of the transmission based upon a maximum reactive torque of the selectively applied clutch of the transmission.

16. The method of claim 11, wherein operating the engine within the allowable range of input torques from the engine comprises controlling spark advance of the engine to limit the torque output from the engine.

17. The method of claim 11, wherein operating the engine within the allowable range of input torques from the engine comprises controlling timing of fuel injection of the engine to limit the torque output from the engine.

18. Method for controlling an internal combustion engine mechanically coupled to a transmission device, the transmission device operative to transfer mechanical power between the engine and a second power generating device and an output member, the method comprising:
monitoring operator inputs to an accelerator pedal and a brake pedal;
determining an accelerator output torque request based upon the operator input to the accelerator pedal;
determining an axle torque response type;
determining a preferred input torque from the engine to the transmission device based upon the accelerator output torque request;
determining a maximum input torque from the engine which can be reacted with the transmission device based upon the accelerator output torque request, the brake torque request and the axle torque response type;
operating the engine at the preferred input torque when the preferred input torque is less than the maximum input torque from the engine which can be reacted with the transmission device; and
limiting the engine to operate at the maximum input torque when the preferred input torque is greater than the maximum input torque from the engine which can be reacted with the transmission device.

* * * * *